June 21, 1960  H. H. ERICKSEN  2,941,436
MUSIC NOTE FINDERS

Filed Nov. 14, 1957  3 Sheets-Sheet 1

INVENTOR.
Helen H. Ericksen
BY Edward Thomas
ATTORNEY

United States Patent Office 2,941,436
Patented June 21, 1960

2,941,436
MUSIC NOTE FINDERS

Helen H. Ericksen, 199 Keiber Court, Richmond, N.Y.

Filed Nov. 14, 1957, Ser. No. 696,411

2 Claims. (Cl. 84—473)

This invention relates to note finders especially adapted for aiding inexperienced musicians and music pupils to locate or to identify written notes on musical staffs; and is herein illustrated as embodied in a device only a few inches long adapted to be placed on standard printed pages of music and to be instantly read to indicate the name of any note printed on the music staff.

Most learners of music are puzzled by the first steps of learning how to turn the printed symbols of musical sounds into actions for producing the sounds. They are puzzled because in a piano keyboard five human fingers must cover seven notes of a piano keyboard, because the lines forming part of the treble clef carry letters and meanings different from the corresponding lines in the bass clef, because some line in either clef sometimes points to a note called a sharp, and sometimes points to another note called a flat, because the names of notes such as do, re, mi, stand for one series of piano keys in one key and for another and different series of keys in another key, and because nothing visible provides a reliable aid in visualizing any connection between the sharps and flats of the written or printed symbols on the staff and the corresponding piano keys.

In the form of the present invention illustrated, a card, which may be of opaque plastic, about five inches long and about two inches wide, contains a long narrow central window with rulings starting from the window edges and lettered at one edge to name the notes on the staff lines and on the other edge to name the notes on the staff spaces.

In the form shown the window is long enough to usually show both the treble clef and the bass clef with several "ledger lines" above and below the staff lines of each clef.

The lines at their edge of the window are lettered with the names of the notes they represent, and the spaces at their edge of the window are lettered with the names of the notes they represent.

Preferably positions of the ledger lines above and below the staff are also indicated and lettered as well as the positions between those ledger lines.

In the form shown the names of the notes above and below the staff are marked along a line offset from the names at the staff, thus clearly indicating the more unusual notes above and below the staff.

The device preferably carries on its back other information or indicia for aiding the student or other user.

In the form shown the back of the device shows the sharps and flats on the staff for every key in which music may be written, and names the key at each of the staffs shown, naming, if desired, both the major and minor keys at each staff.

To avoid catching a window edge on the edge of the sheet music, the window is preferably covered with a transparent sheet, and, in the form shown, the whole device is covered by extensions of the transparent sheet, thus serving to protect and strengthen the whole device if it is printed cardboard.

It is found that the device illustrated is an extraordinary aid in straightening out in the minds of children most of the complexities of printed or written music notation.

Other features and advantages will hereinafter appear.

In the form shown the device takes the form of an opaque cardboard body 10 long enough to cover and extend beyond the treble clef shown on it at 11 and beyond the upper ledger lines such as 12. The body also extends downward beyond a typical bass clef 13.

Figure 1:
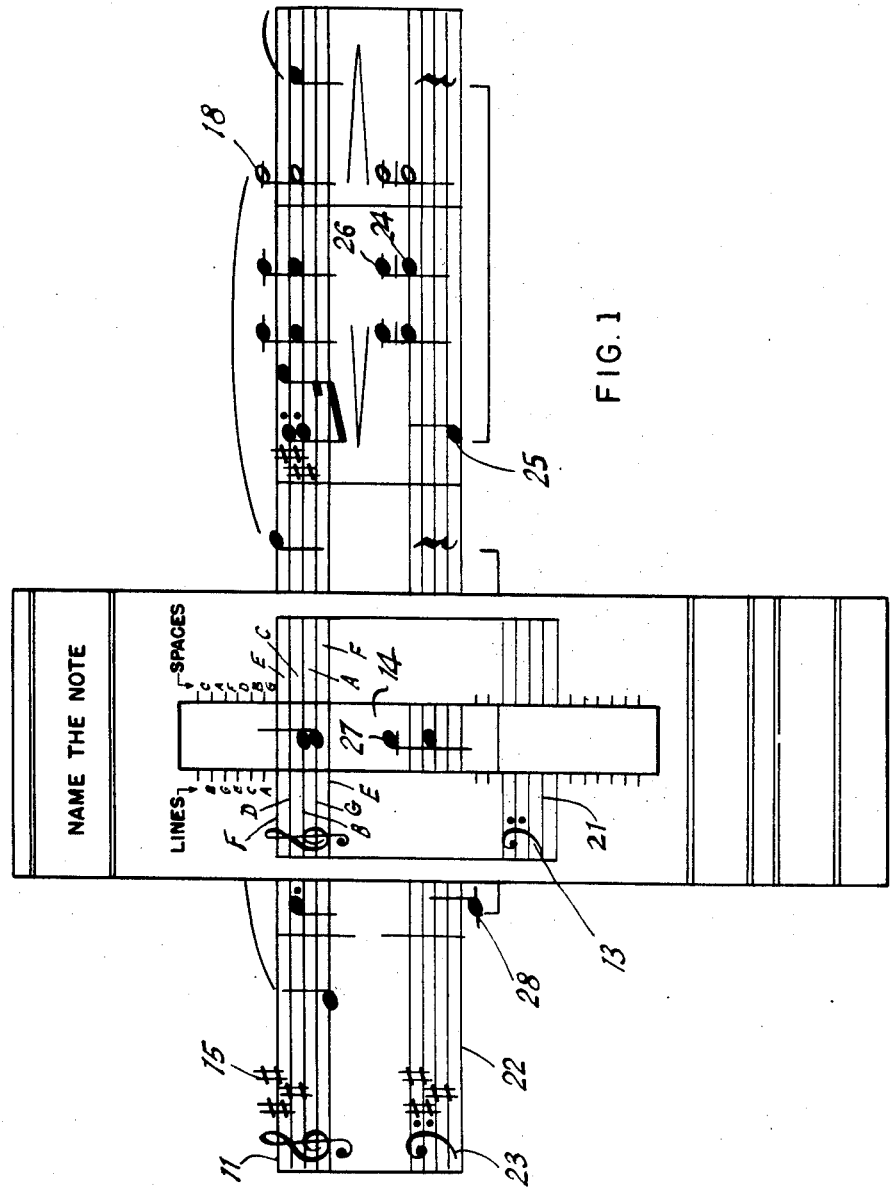
Fig. 1 shows the device, fragmentarily marked, as used on the treble clef.
Figures 3, 4:
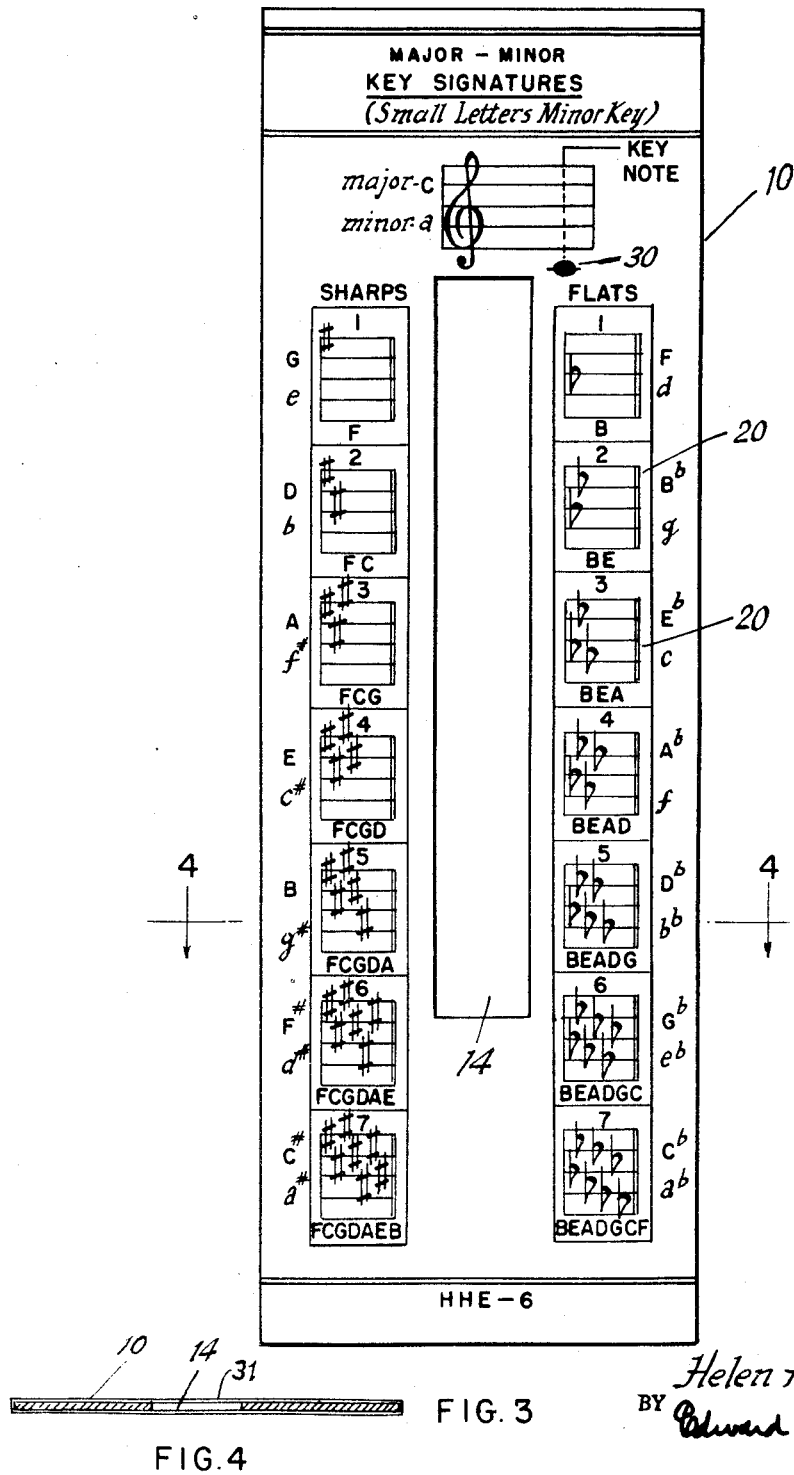
Fig. 3 shows on the same scale the back of the device with all notations.
Fig. 4 is a section on broken line 4—4 of Fig. 3.

The center of the body 10 is shown as a long somewhat narrow window 14 wide enough to display the usual sharps, such as those shown at 15, Fig. 1 or, alternatively, the usual flats, shown along the right hand edge of the window 14 in Fig. 3, as at 20.

Figure 2:
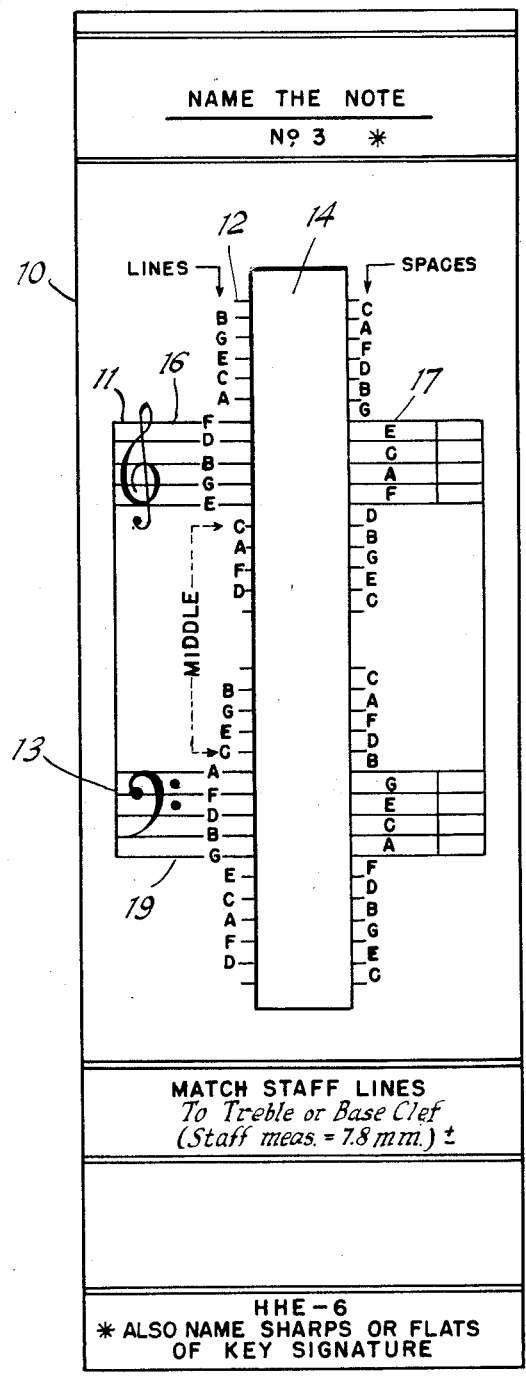
Fig. 2 shows on an enlarged scale the face of the device with all notations.

Along the lefthand edge of the window 14 in Fig. 2 are shown the lines 16 corresponding to the note identifying lines E, G, B, D, and F, of the staff 11 and identified by those letters.

The lines 16 are continued at the right hand edge of the window as at 17, and at this side the continuations 17 serve to mark off the spaces between them lettered with the note-identifying letters F, A, C, E.

The notes above the treble staff, such as the note 18 in Fig. 1, one line above line F, are identified by the upper ledger lines 12, and the note 18 is thus identified on the first upper ledger line A on the body 10.

Any notes on ledger lines below the treble staff 11 are similarly identified.

Notes in spaces between the ledger lines 12 are similarly identified by letters as G, B, D, F, in spaces between the lines at the right of the window 14.

The body 10 is also adapted to show, or to be shifted to identify by lines 19, and by the letters A, F, D, B, G, the names of the notes of the bass clef 13 as those musical notes are indicated, for example on the bass clef 19 of Fig. 2.

To this end the body 10 of Fig. 1 would be shifted upwards until the lines 21 of the bass clef 13 coincide with the lines 22 of the bass clef 23 of the sheet music shown in Fig. 1.

Then the lettered lines 19, as shown in Fig. 2 point out the names of the notes, not only of the lines G, B, D, F, A, such as note 24 of Fig. 1, but also the names of the notes between the lines such as the note 25. The short lines C, E, G, point out the name of the note 26, two ledger lines above the lines 19, and also point out the name of the note 27 in the space above the first ledger line marked B on Fig. 2. Similarly the Fig. 2 names the note 28 as E on the first ledger line below the staff of Fig. 1.

As mentioned above, the back of the device carries on the left side of the window 14 staffs of sharps of every key, and alongside of each staff is the capital letter naming the major "key" represented by that staff, and the lower case letter naming the minor "key" represented by that staff.

At the top is shown the staff of key of C major or a minor, together with its key note 30 on the first ledger line below the clef.

At the right edge of the window 14 are shown the staffs of flats of every key, and alongside of each staff is a capital letter naming the major "key" represented by that staff, and the lower case letter naming the minor "key" represented by that staff.

The cardboard body 10 is preferably covered by a transparent sheet 31 which insures that the edges of the window 14 will not catch on the edge of any page on which it may slide, and the sheet 31 may, as shown in Fig. 4, cover both sides of the body 10, and may serve as to protect body 10 against soiling especially if the sheet 31 is a smooth transparent plastic material.

It will be noted that the body 10 may be placed with its window 14 over the key signature 11 and then it shows the names of all the sharps or flats of the key signature.

Sometimes the body 10 is colored yellow at the staff lines adjacent window, facilitating the lining up of the body 10 on the printed staff.

Having thus described one embodiment of the invention what is claimed is:

1. A device for reading notes on a musical staff comprising an opaque card having an elongated window therein, at least one staff representation extending transversely of said card and having aligned portions on each side of said window, staff line designations along one side of said window and space designations along the opposite side of said window, whereby when said card is placed on a music staff to expose a note through said window the designation corresponding to said note may readily be observed.

2. A device according to claim 1, in which the staff line designations along one side of said window form one column, ledger line designations along the same side of the window forming a column offset from said staff line designations, and in which the space designations along the opposite side of the window form a separate column, and ledger line space designations along said opposite side forming a column offset from said column of space designations.

References Cited in the file of this patent

UNITED STATES PATENTS

| | | |
|---|---|---|
| 502,183 | Gallegos | July 25, 1893 |
| 2,063,501 | Harbo | Dec. 8, 1936 |
| 2,516,485 | Rogers | July 25, 1950 |

FOREIGN PATENTS

| | | |
|---|---|---|
| 136,874 | Great Britain | Dec. 17, 1919 |
| 101,794 | Austria | Nov. 25, 1925 |